Jan. 13, 1959
E. L. HAVENS
2,868,188
VALVE SPRING SPACER
Filed Oct. 15, 1956
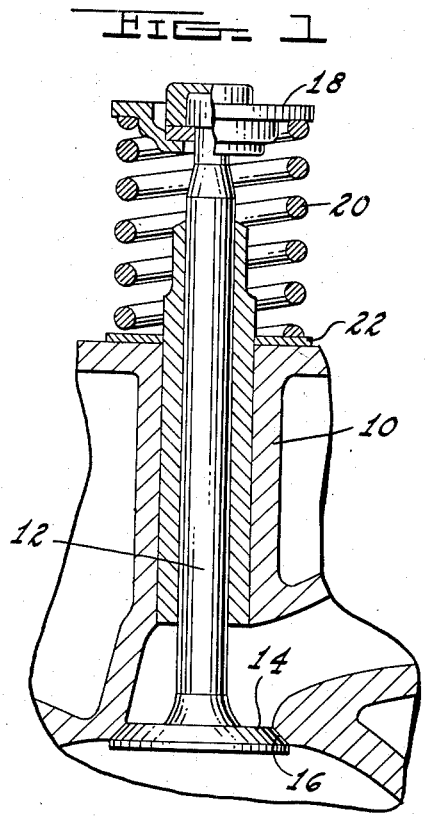
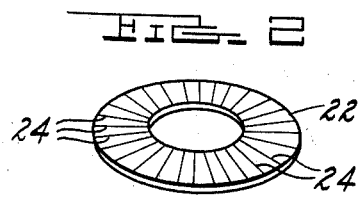
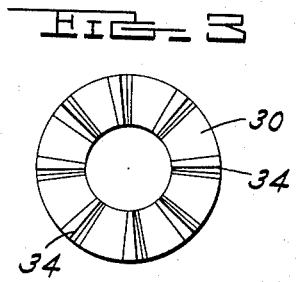
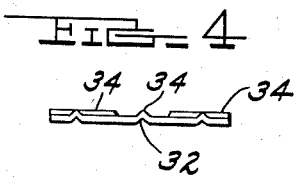
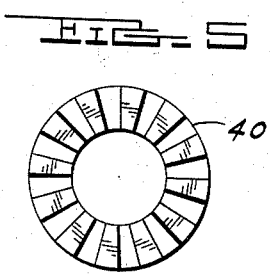
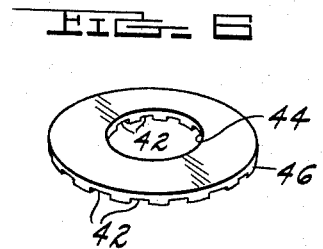
INVENTOR.
*ELWOOD L. HAVENS*
BY
*Barnes, Kisselle, Laughlin & Raisch*
ATTORNEYS

# United States Patent Office 2,868,188
Patented Jan. 13, 1959

2,868,188
VALVE SPRING SPACER

Elwood L. Havens, Dearborn, Mich., assignor to Silver Seal Products Co., Lincoln Park, Mich., a corporation of Michigan Application October 15, 1956, Serial No. 615,829

5 Claims. (Cl. 123—188)

This invention relates to a valve spring spacer.

Frequently, it is desirable to increase the tension of a valve spring in an automotive engine by inserting a shim or spacer of certain thickness dimension between the spring and the block.

It is an object of the invention to provide a valve spacer unit which compensates for spring wear in the block and on the spring cap and also on the spring ends.

It is also an object to provide a device which can compensate for loss of spring tension due to torsional relaxation resulting from heat and use and due to a possible change of dimension resulting from the wear of the valve and the block and also to a valve grinding operation.

It is an object further to provide a spacer unit which is particularly adapted to insulate the spring to a degree from the heat of the valve block and also to prevent circumferential creeping which increases the wear.

Other objects and features of the invention relative to various details of the invention will be apparent in the following description and claims.

Drawings accompany the description and the various views thereof may be briefly described as:

Figure 1, a sectional view of a spring assembly showing the spacer in place.

Figure 2, a perspective view of a spacer shown in section in Figure 1.

Figure 3, a plan view of a modified form of spacer.

Figure 4, a side elevation of the spacer shown in Figure 3.

Figure 5, a second modification of a spacer shown from the bottom.

Figure 6, a plan view of the spacer illustrated in Figure 5.

Referring to Figure 1, a motor block 10 has a valve 12 and a valve head 14 operating in a seat 16. The valve stem has a spring cap or seat 18 and a spring 20 to urge the valve to closed position. Interposed between the lower end of the spring, as shown in Figure 1, is a spacer shim 22 shown in plan view in Figure 2. This spacer shim has a series of radial serrations 24 which comprise shallow grooves formed in the surface on one side. This surface is applied to the block opposite the spring, as shown in Figure 1, and serves to prevent rotation of the spacer relative to the spring and the block.

A modified form is shown in Figures 3 and 4, where both surfaces of the spacer 30 are provided with interruptions, a groove 32 being formed on one side and a small embossment 34 being provided on the other.

In Figures 5 and 6, a second modification is shown in which radial grooves are milled or stamped to one surface of a spacer 40, these grooves 42 being open at the peripheral inner and outer edges 44 and 46. The modifications of Figures 3 and 5 each serve to prevent rotation of the spacer and also to permit air flow through the grooves, thereby cutting down the heat transfer from the block to the spring.

The overall thickness of these spacers can be varied, depending on the age of the automobile and the need for spring compensation. The two thicknesses usually provided are .060 inch and .030 inch. A caliper measurement can be made between the underside of the spring retainer and the contact surface of the spring to determine whether this distance has angled due to wear or for other reasons. If necessary, additional spacers can be introduced. As a general rule, a spacer with a predetermined thickness is desired since the compensation can be uniform throughout the entire engine.

I claim:

1. A device for altering valve spring tension in an internal combustion engine which comprises, an apertured disk of uniform predetermined thickness having at least one surface provided with interruptions extending radially to adapt it to mechanically engage a surface in contact therewith under pressure, said interruptions comprising, a radial groove on one side of said device and a radial embossment on the other side.

2. A device for altering valve spring tension in an internal combustion engine which comprises an apertured disk of uniform predetermined thickness having at least one surface provided with interruptions extending radially to adapt it to mechanically engage a surface in contact therewith under pressure, said radial interruptions comprising a plurality of formed grooves on one surface only, said grooves being open at their outer and inner extremities and being wider at the outer extremity, the sides thereof being radial to the device, said grooves serving as air passages between the disc and the surface which it contacts.

3. The combination in an internal combustion engine of a valve seat, a valve guide co-axial therewith spaced from the seat and projecting beyond a surface radial to said guide, a unitary valve and stem associated with said seat, the stem passing through said guide and projecting therefrom, a valve spring cap on the end of said guide overlying said radial surface, a spring interposed between said surface and said guide to move said valve to a closed position relative to said seat, and a spring tension control unit comprising an apertured disk concentric with said valve guide and lying against said radial face and held in position against radial displacement by said valve guide, and interruptions extending radially on the face of said spring control unit lying against said radial face to prevent circumferential movement of said unit relative to said face and said spring, said interruptions being of sufficient depth to provide air passages between said disc and said radial surface.

4. A device as defined in claim 3 in which the control unit has surface interruptions on both sides, each interruption comprising, respectively, a groove formed in one face of the unit and shaped upwardly into a radial embossment in the other face.

5. A device as defined in claim 3 in which said radial interruptions comprise, a plurality of formed grooves on one surface only, said grooves being open at their outer and inner extremities and being wider at the outer extremities, the sides thereof being radial to the unit.

References Cited in the file of this patent

UNITED STATES PATENTS

| 122,676 | Stouffer | Jan. 9, 1872 |
| 1,595,317 | Scholey | Aug. 10, 1926 |
| 1,877,384 | Burkhalter | Sept. 13, 1932 |
| 2,063,882 | Noble | Dec. 8, 1936 |
| 2,191,333 | Willgoos | Feb. 20, 1940 |
| 2,426,438 | De Pew | Aug. 26, 1947 |
| 2,613,656 | Leach | Oct. 14, 1952 |
| 2,778,399 | Mroz | Jan. 22, 1957 |

FOREIGN PATENTS

| 852,578 | France | Oct. 30, 1939 |